L. A. HORNBURG.
BLEEDING VALVE.
APPLICATION FILED AUG. 30, 1921.
1,430,507.
Patented Sept. 26, 1922.
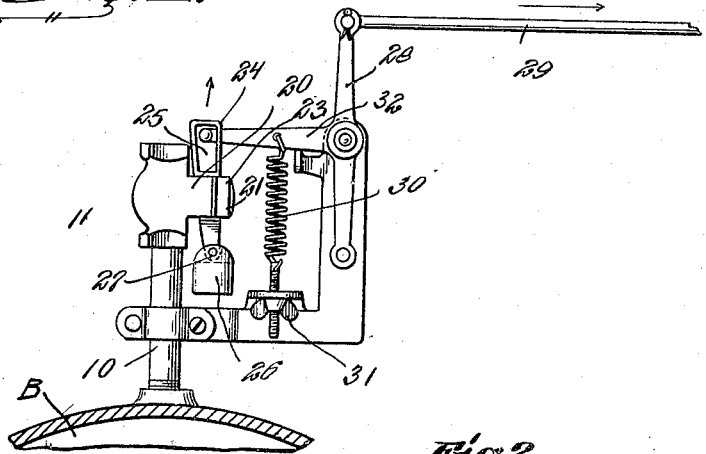
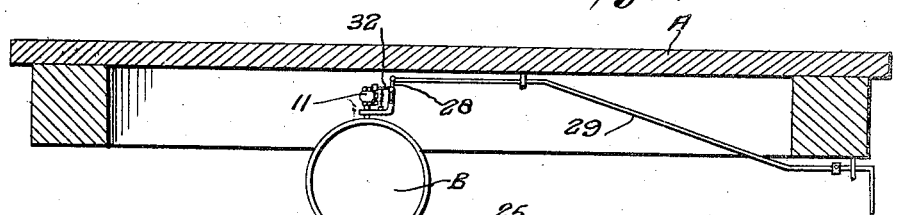
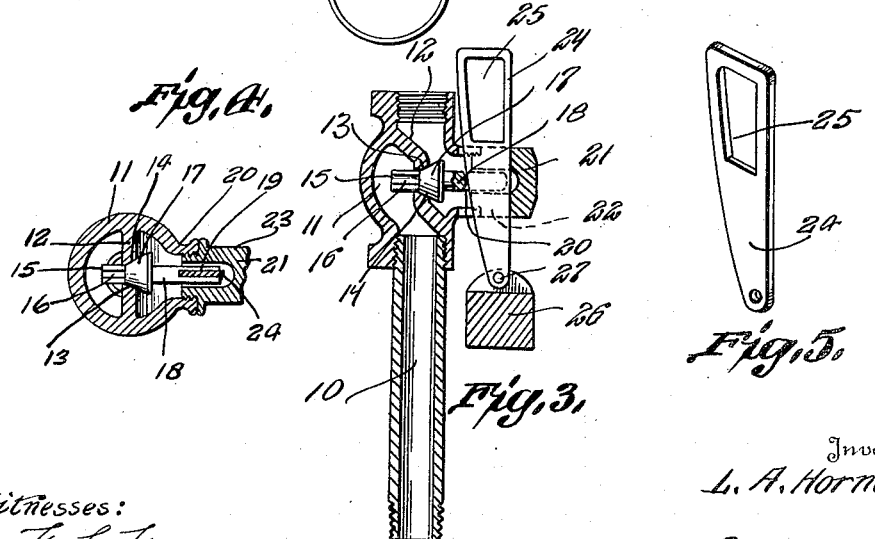
Inventor
L. A. Hornburg
By Victor J. Evans
Attorney
Witnesses:
F. L. Fox, Patented Sept. 26, 1922.

1,430,507

UNITED STATES PATENT OFFICE.

LOUIS A. HORNBURG, OF OMAHA, NEBRASKA.

BLEEDING VALVE.

Application filed August 30, 1921. Serial No. 496,992.

*To all whom it may concern:*

Be it known that I, LOUIS A. HORNBURG, a citizen of the United States, residing at Omaha, in the county of Douglas and State of Nebraska, have invented new and useful Improvements in Bleeding Valves, of which the following is a specification.

This invention relates to the air brake systems of trains and has for its object the provision of a novel bleed valve associated with the air brake cylinders whereby the air line may be bled to effect releasing of the brake in a much shorter length of time than can be accomplished with the ordinary type of bleed valves used.

An important and more specific object is the provision of a bleed valve of this character which is operated by means of a rod placed at some convenient location to be reached by a train-man, the construction being such that when a slight pull is applied to the rod the valve will remain open until the bleeding is accomplished whereupon the valve will automatically reclose.

Another object is the provision of a bleed valve of this character which may be associated with either the top or the bottom of the brake cylinder, my device including a key which is reversible depending upon the position of the valve.

An additional object is the provision of a device of this character which will be simple and inexpensive in manufacture and installation, highly efficient in use, a great time and labor saver, durable in service and a general improvement in the art.

With the above and other objects and advantages in view, the invention consists in the details of construction to be hereinafter more fully described and claimed and illustrated in the accompanying drawings in which—

Figure 1 is a longitudinal sectional view through at least a portion of a brake cylinder showing my valve associated therewith, Figure 2 is a cross-sectional view through a car showing the brake cylinder equipped with my valve, Figure 3 is an enlarged longitudinal sectional view through my valve, Figure 4 is a similar view taken at right angles to Figure 3 and Figure 5 is a detail view.

Referring more particularly to the drawings, the letter A designates a portion of a rail-road car and B designates an auxiliary reservoir of the air-brake system. It is well known that the reservoir must be bled of the air therein in order to effect release of the brake. With the bleed valve ordinarily used it is also well known that the trainman must stand and hold the valve in open position until it is completely bled, this operation requiring from one half to one minute per car. On a long train it is apparent that the length of time required will be considerable and this is a great disadvantage attendant upon the use of the ordinary valve structure.

In carrying out my invention I make use of a very short section 10 of pipe which is screwed into the hole provided in the reservoir for the reception of the bleed valve. Screwed upon the free end of this pipe section 10 is a valve which includes a casing 11 of T-shape and having one end communicating with the pipe 10 and its other end communicating with the atmosphere. Located within this casing 11 is a partition 12 through which air must pass in order to escape from the reservoir to the atmosphere. This partition 12 is formed with a hole 13 surrounded by a valve seat 14 which is normally closed by a valve including a guide pin 15 grooved as shown at 16 and fitting more or less loosely within the hole 13. The valve further includes the valve proper which is formed as a tapered enlarged portion 17 from which extends an operating stem 18 longitudinally slotted as indicated at 19. The valve hole 13 and consequently the valve device for closing the seat surrounding this hole is located in alignment with a lateral nipple 20 formed on the housing or casing 11. This nipple 20 is internally threaded and engaged therein is a screw plug 21 which is slotted as shown at 22 and which has its outer end formed angularly as shown at 23 for engagement by a wrench or the like whereby to effect turning of the plug. When the plug is properly in position the slot 22 therein will register with the slot 19 in the operating stem 18.

The numeral 24 designates a wedge shaped key which of course has inclined sides and which has one end formed with an elongated opening 25. This key 24 is slidably engaged within the registering slots 19 and 22 and when the key is moved up or down as the case may be it will be quite apparent that it will either permit the valves to move outwardly to unseat from the seat 14 or will force the valve into engagement with its seat. The end of the key most remote from the opening 25 therein carries a weight 26 held associated with the key by a removable pin 27.

Associated with the key 24 is a short bar 28 which has its ends pivotally connected with push or pull rods 29 which extend at the sides of the car in position to be pulled or pushed by a train-man to effect unseating of the valves to effect bleeding of the reservoir. This bar 28 is provided at its center with a spring 30 having a thumb screw adjustment 31 to keep it in place but so as not to interfere with the valve closing as will be hereinafter fully explained. Suitably secured to the bar 28, preferably at the center thereof, is an L-shaped arm 32 which has its outer end fitting within the opening 25 of the key 24.

Under ordinary conditions, the weight 26 carried by the key 24 will hold the key 24 in its lowermost position whereupon the wider portion thereof will engage within the registering slots 22 and 19 and will of course hold the stem 15 in its innermost position with the enlargement 17 thereon seating upon the seat 14 and closing the hole 13. Air within the reservoir then cannot escape as will be readily apparent. When it is desired to effect bleeding of the reservoir it is merely necessary that the operator grasp one of the rods 29 and pull or push thereon, depending upon the way it is mounted, whereupon the L-shaped arm 32 carried by the bar 28 will result in moving the key 24 upwardly. As the key 24 moves upwardly it will naturally not engage firmly within the slot 19 of the operating stem of the valve and the air pressure within the reservoir and passing through the valve casing 11 will of course force the valve 17 outwardly out of engagement with the seat 14 so that air may pass through the hole 13 and escape into the atmosphere. It is not necessary that the operator continue to hold the rod 29 at the releasing position as the pressure of the outrushing air will prevent the valve from reseating until the reservoir has been entirely bled. When the air pressure is thus reduced to normal, it will be apparent that the weight 26 pulling upon the key 24 will return the latter to its initial position and this will of course wedge the control valve into engagement with its key 14 in exactly the same position as it occupied originally. Further air of course cannot escape and when the pressure is again applied the air cannot escape until the push rod or pull rod 29 is pulled by the train-man. It should also be stated that the device may be used equally well upon the top or the bottom of the reservoir, it being only necessary that in one position or the other the key 24 must be removed and reversed so that the weight 26 will always be at the bottom.

From the foregoing description and a study of the drawings it will be apparent that I have thus provided an extremely simply constructed and consequently inexpensive bleed valve for use upon the brake reservoir of an air brake system of a train whereby the bleeding action may be effected in a remarkably short time and without any necessity for a lever or other controlled device to be held by the train-man having charge. It will also be noticed that the device will automatically reseat itself after the pressure is relieved and in this way it is quite obvious that its use will be a distinct advantage in saving time and labor.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention, I claim;

1. A bleed valve comprising in combination with the auxiliary reservoir of an air brake system, a casing having one end connected with the bleed port of the reservoir and having its other end communicating with the atmosphere, said casing being formed with a lateral nipple, a partition within the casing provided with a hole surrounded by a valve seat, the hole establishing communication between the bleed port and the atmosphere, a valve slidable through the lateral nipple and normally closing said seat, a weight controlled wedge member engaging against said valve for holding the same closed, and means for moving said member.

2. A bleed valve comprising in combination with the auxiliary reservoir of an air brake system, a casing having one end connected with the bleed port of the reservoir and having its other end communicating with the atmosphere, said casing being formed with a lateral nipple, a partition within the casing provided with a hole surrounded by a valve seat, the hole establishing communication between the bleed port and the atmosphere, a valve slidable through the lateral nipple and normally closing said seat, a weight controlled wedge member engaging against said valve for holding the same closed, and means for moving said member, said means comprising a pair of push or pull rods located at the sides of the bar.

3. A bleed valve comprising the combination with the auxiliary reservoir of a railway air brake system, of a casing communicating at one end with the bleed port of the reservoir and communicating at its opposite end with the atmosphere, said casing being provided in one side with a laterally extending nipple and being provided internally with a partition having a hole provided with a valve seat surrounding the same, a valve slidable through said lateral nipple and normally closing said seat, a vertically movable wedge shaped member engaging the outer end of said valve whereby to normally hold the same closed, and manual means located at the sides of a car and connected with said wedge member whereby to elevate the same for permitting pressure against said valve to open the latter.

4. A bleed valve comprising the combination with the auxiliary reservoir of a railway air brake system, of a casing communicating at one end with the bleed port of the reservoir and communicating at its opposite end with the atmosphere, said casing being provided in one side with a laterally extending nipple and being provided internally with a partition having a hole provided with a valve seat surrounding the same, a valve slidable through said lateral nipple and normally closing said seat, a vertically movable wedge shaped member engaging the outer end of said valve whereby to normally hold the same closed, and manual means located at the sides of a car and connected with said wedge member whereby to elevate the same for permitting pressure against said valve to open the latter, said means comprising a bar, push or pull rods connected with the ends thereof and an arm on said bar having a lost motion connection with said wedge member.

5. A bleed valve of the character described comprising a casing having one end communicating with the bleed port of the auxiliary reservoir of a rail-way air brake system, the opposite end of the casing communicating with the atmosphere, the casing being provided at one side with a lateral nipple and being provided internally with a partition having a hole surrounded by a valve seat, said lateral nipple being slotted, a valve having a guide stem slidable through said opening and having an enlarged portion constituting a valve proper normally closing said seat, the valve having the outer end of the stem extending beyond the valve proper and formed with a slot registering with the slot in the nipple, a slotted plug screwed into and closing said extension, all of said slots being in registration, a vertically movable wedge shaped key slidably engaged within all of said slots and having its lower end provided with weights, and manually controlled means located at the sides of a car connected with said key whereby to move the same.

In testimony whereof I affix my signature.

LOUIS A. HORNBURG.